Sept. 5, 1933.   E. D. TILLYER   1,925,576
EYE TESTING INSTRUMENT AND METHOD
Filed Nov. 16, 1929
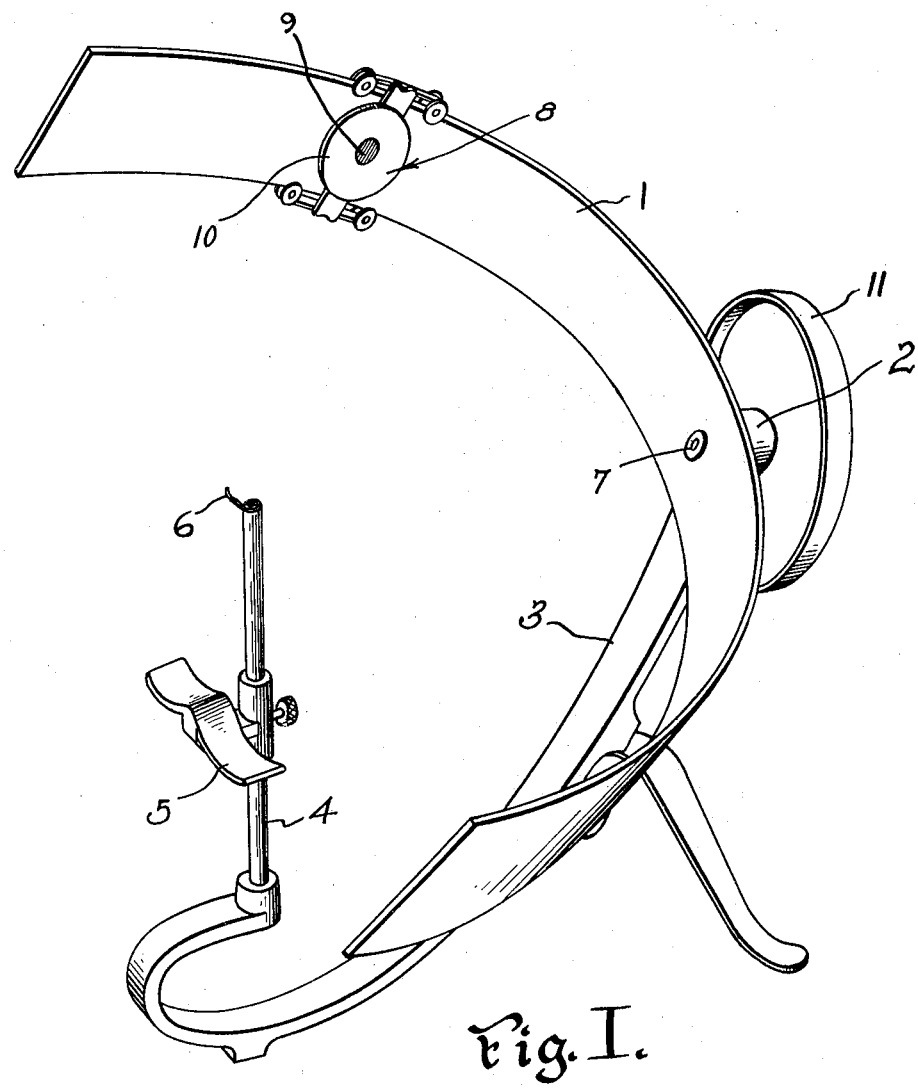
Fig. I.
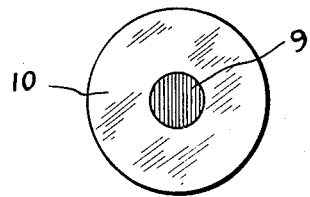
Fig. II.
INVENTOR
*Edgar D. Tillyer.*
BY *Harry H. Styll*
ATTORNEY Patented Sept. 5, 1933

1,925,576

UNITED STATES PATENT OFFICE 1,925,576

EYE TESTING INSTRUMENT AND METHOD

Edgar D. Tillyer, Southbridge, Mass., assignor to American Optical Company, Southbridge, Mass., a voluntary association of Massachusetts Application November 16, 1929
Serial No. 407,679

3 Claims. (Cl. 88—20)

This invention relates to improvements in eye testing instruments and has particular reference to improved means for mapping out the color fields of an eye.

The principal object of the invention is to provide improved means for increasing the accuracy, speed and ease in mapping out the color fields of an eye.

Another object of the invention is to provide improved means for detecting color deficiencies.

Another object is to provide improved means of obtaining the accurate size of the color fields of an eye.

Another object is to provide simple, efficient and economical means for accomplishing the most accurate results in color field examination.

Other objects and advantages of the invention will become apparent from the following description taken in connection with the accompanying drawing, and it will be apparent that many changes may be made in the details of construction and arrangements of parts without departing from the spirit of the invention as expressed in the accompanying claims. I, therefore, do not wish to be limited to the exact details shown and described as the preferred form only has been shown by way of illustration.

Referring to the drawing:

Fig. I is a perspective view of the instrument embodying the invention.

Fig. II is a face view of the improved test object.

Eye testing instruments used in mapping out the color fields of an eye are commonly known as perimeters. Most of these instruments comprise an arc shaped arm pivoted at its center to a support on which a head rest or similar means is mounted for fixing the eye of the patient at a position approximately at the center of the curve of the arc. A fixation spot is placed on the arc at a point in line with the axis of its pivot to provide means by which the patient may make his fixation during the test. The color test is made by moving a colored test object inwardly or outwardly along the perimeter arm in an irregular or straight path until the point of disappearance and re-emergence of that particular color is located. This point is then recorded as the boundary of the color field in that meridian. To map out the entire color field the perimeter arm is rotated to different meridians where a repetition of the test is made and recorded. A different colored test object being used for each test until the various color fields have been mapped out.

In the past, much difficulty has been encountered in judging just where the various color fields ended. In several instances inaccuracies and misjudgments were introduced through confusions and doubts caused by a change in the apparent intensity of the test object as it was moved to the margin of the color field or by a form or shape which remained after the color had disappeared.

Several means to obviate these difficulties and uncertainties have been tried in the past, one of which, was to make the brightness of the test spot and the brightness of its surrounding field of the same normal visual intensity. The intention of this device was to have the color spot fade out and disappear when the edge of the color field of the eye was reached. By reason of the fact that the color sense of a normal eye changes at the margin of its color fields, this device was a failure, since the test color could still be seen as a difference in brightness. For example, when testing the red color field of an eye, a red colored test spot having a grey surrounding field of the same normal visual intensity was employed.

It is apparent that when this test object was moved to the margin of the red color field or at the point where the red color sense of the eye vanished, that only the red was affected. Therefore, the red and grey, which was of the same normal visual intensity when in the center of the red field, appeared at this point as being of a different intensity and did not produce the desired results.

The present invention obviates this difficulty by providing means wherein the colored spot will blend or fade into its surrounding field when moved to the margin of the color field being tested. This dispenses with any shapes or illusive effects of which the patient is apt to be in doubt.

Referring more particularly to the drawing wherein like characters of reference designate like parts throughout, the invention is shown applied to an eye testing instrument known as a perimeter. This particular instrument comprises an arcuate arm 1 pivoted at 2 to a support 3. The said support is provided at its forward end with an upright 4 for supporting the chin rest 5 and an eye sighting point 6. The eye sighting point 6 is located approximately at the center of the curve of the arc 1 so that the rotation of said arc will not change the relative position of the eye to the arc. A fixation spot 7 is placed on the arc 1 at a point in line with the axis of its pivot to provide means upon which the patient may fix his eye during the test. A test object 8 is slidably attached to the arcuate arm 1 and is movable longitudinally of said arm to test the eye. In this instance the test object 8 is formed by placing a colored spot 9, say of red, on a grey back field 10. The red spot 9 is of a calculated color which is brighter than the grey back field 10 when placed at the center of the color field of a normal eye, but when placed at the margin or edge of said field it will appear as being of the same visual intensity. The test object 8 may be slidably attached to the arcuate arm 1 as shown in the drawing or may be mounted on the end of a rod held in the hand of the operator. The test spot 9 may be of any desired color such as red, green, yellow or blue depending solely upon the field being tested. A suitable chart holder 11 is mounted on the instrument for holding the charts on which the findings of the test are recorded.

The employment of the perimeter with the improved test object 8 is as follows: the head of the patient is placed on the chin rest 5 and his eye to be tested is placed in position relative to the sighting means 6. The other eye being covered by any suitable means.

He is then told to make his fixation on the spot 7. The test object 8, for example having a red spot 9 on a grey back field 10, is placed upon the perimeter arm 1 at about the position at which the test is to be made and is moved along the perimeter arm in an irregular or straight path similar to that which has been previously described. The patient is asked during the test if he can distinguish any color spot upon the test object. The degree, angle etc., at which the red colored test spot disappears and re-emerges in the color field is recorded. This operation is repeated in several different meridians until the entire color field is recorded. By reason of the fact that the visual intensity of the red colored test spot 9 is previously increased an amount sufficient to compensate for the absence of the red color sense at the edge of the red sensation field, the two fields, that is the red and grey, will appear at that point as being of the same visual intensity. When the test spot passes over the boundary of the red sensation field or when the limit of sensitivity of the eye is reached the test spot will disappear or fade out completely and will not turn into a different color or form of which the patient is apt to be in doubt.

This blending takes effect because of the fact that the margin of the red sensation field only changes the intensity of red spot and does not change the intensity of the grey back field. The calculation of the red intensity is such that when the change takes place the two fields, that is the red and grey, will appear as being only a uniform grey. When the red color sense is gone the red spot disappears entirely. This lends much ease and certainty of making the judgment.

It will be understood that the red colored spot is used only as means of illustration and that the variance of intensity of a test spot of any color will produce the same result.

The test object 8 is selected previous to the test by asking the patient to pick out from a series of test objects of different intensities a test spot 9 of a given color which is brighter than the surrounding field 10. The degree of intensity necessary to produce accurate results varies from one eye to another, and a test object of the proper degree of brightness may be picked out by the patient by the cut and try method, as follows:

A test object of a certain degree of brightness is placed on the grey field and the grey field and test object are moved until they pass out of the patient's view. If the spot merges with the grey field and becomes indistinguishable before the grey field disappears, then the test object of the proper degree of brightness has been found, but if the spot merely loses its color and does not become invisible before passing out of the patient's field of view, other test objects must be tried until one of the proper degree of brightness has been found.

Both eyes can be independently examined by simply reversing their positions.

From the foregoing description it will be seen that I have provided simple, inexpensive and efficacious means for increasing the accuracy, ease and speed in mapping out the color fields of an eye.

Having described my invention I claim:

1. The method of testing the color field of an eye comprising submitting to the eye simultaneously a plurality of test objects, each of which has a background of the same color and the same color intensity and each of which has a color spot in the field of said background of different color from the background and of the same color as that of the other spots and of a different color intensity from that of each of the other spots, to determine the object whose color spot appears brightest to the eye, then moving said determined object towards the periphery of the field of vision of said eye and determining the position in the said field where said color spot will disappear from the vision of said eye.

2. The method of testing the color field of an eye comprising submitting to the eye simultaneously a plurality of test objects, each of which has a background of the same color and the same color intensity and each of which has a color spot in the field of said background of different color from the background and of the same color as that of the other spots and of a different color intensity from that of each of the other spots, to determine the object whose color spot appears brightest to the eye, then moving said determined object towards the periphery of the field of vision of said eye and determining the position in the said field where said color spot will disappear from the vision of said eye, and in event said color spot does not disappear from vision in said field, then successively moving the remaining objects in the order of the brightness of their color spots until one of the color spots will so disappear from vision.

3. In a device of the character described a perimeter having a rotatable arcuate field member, a test chart holder slidable on said member and having a seat for a test chart and a plurality of test charts each shaped to fit in the seat of the chart holder and each chart comprising a plurality of separate test objects, each object having a background of the same color and of the same intensity of that color and each having a contrasting color spot in the field of the background, each of said color spots being of the same color but of a different color intensity from each other.

EDGAR D. TILLYER.